United States Patent [19]

Bowen

[11] 4,350,419
[45] Sep. 21, 1982

[54] FRONT PROJECTION PHOTOGRAPHIC APPARATUS

[75] Inventor: Kenneth S. Bowen, Hayling Island, England

[73] Assignee: Bowens Sales and Service Limited, London, England

[21] Appl. No.: 199,848

[22] Filed: Oct. 23, 1980

[51] Int. Cl.³ .................. G03B 35/00; G03B 11/00; G03B 27/32

[52] U.S. Cl. .................. 354/110; 354/295; 355/39

[58] Field of Search ........... 354/110, 295, 296, 286; 24/201 R

[56] References Cited

U.S. PATENT DOCUMENTS

| | | | |
|---|---|---|---|
| 1,642,278 | 9/1927 | Vanderlipp | 24/201 R |
| 1,885,555 | 11/1932 | Schwartz | 355/39 X |
| 2,459,418 | 1/1949 | Ellis | 355/39 |
| 2,516,582 | 7/1950 | McCullough | 354/295 X |
| 2,602,369 | 7/1952 | Tuttle | 355/39 |
| 2,626,537 | 1/1953 | Flank | 355/39 X |
| 2,732,776 | 1/1956 | Meixner | 354/286 X |
| 4,018,519 | 4/1977 | Clapp | 354/110 X |
| 4,137,540 | 1/1979 | Curtis | 354/296 |

FOREIGN PATENT DOCUMENTS

| | | |
|---|---|---|
| 1063391 | 3/1967 | United Kingdom . |
| 1116797 | 6/1968 | United Kingdom . |
| 1129311 | 10/1968 | United Kingdom . |
| 1281584 | 7/1972 | United Kingdom . |
| 1423836 | 2/1976 | United Kingdom . |

*Primary Examiner*—Donald A. Griffin
*Attorney, Agent, or Firm*—Young & Thompson

[57] ABSTRACT

A front projection apparatus has a tubular adaptor (22) which can be connected to a camera lens system housing (25) at one end and received at the other in an aperture (19) in a wall (20) of the apparatus, in a position such that the lens system views an image projected by the apparatus along the projection axis (12). A flange (26) on the adaptor defines the position of the lens system along the projection axis and the adaptor can be clamped in place by this flange. The camera body (29) is slidable axially of the lens system on a vertically adjustable support (14), so the camera can be focussed without changing the positions of the lens system on the projection axis.

10 Claims, 3 Drawing Figures

FRONT PROJECTION PHOTOGRAPHIC APPARATUS

BACKGROUND OF THE INVENTION

Front projection photographic apparatus conventionally comprises a projector for projecting onto a screen a background image, so that a subject can be photographed against the projected image by a camera located on the same side of the screen as the projector. The screen should have high reflectivity along the projection axis of the apparatus, so that the projected light reflected from the subject is of low intensity compared with that reflected from the screen. The shadow on the screen formed by the subject in the light from the projector must not of course appear in the photograph, so a semi-reflective or half-silvered mirror is used to enable the camera to see the projected image along the projection axis. It is necessary also that the nodal points of the lens system of the projector and the camera be coincident.

Front projection apparatus has accordingly been constructed in the past as a support structure for mounting the projector so as to throw its beam for example substantially vertically upward onto a half-silvered mirror arranged to reflect the beam substantially horizontally. The structure also receives the camera in a position to view the projected image through the mirror along the axis of the projected beam. The support structure conveniently holds the projector and the mirror in fixed relation and provides a camera mount adjustable for a variety of cameras.

To effect the precise adjustment of the camera position necessary for the best results, light is projected outwardly through the camera lens system, only a very narrow beam being projected, as by restriction of the iris, for example, a very narrow beam is projected also through the projector. The camera position is adjusted until these two beams are seen to be aligned at any position along the projection axis. The camera body can then be clamped to the apparatus. This procedure is laborious and time-consuming and discourages use of the apparatus.

It is essential for best results not only that the camera views along the projection axis, but also that the nodal points of the camera and projector lens systems be coincident on the axis. If this is not so and the camera is in effect rearward of the projection position a fringe will be noted on the resultant photograph at the edges of the subject. If the camera is in effect forward of the projection position, a fringe will be noted similarly at any internal edge of the subject. This disadvantage can readily arise in practice, because any movement of the subject after the apparatus has been set up which requires refocussing of the camera, will displace the camera nodal point with respect to that of the projector.

It is among the objects of the invention to provide a sighting or registration means whereby a camera can be correctly positioned with respect to a front projection apparatus in a simple way.

It is a further object of the invention to provide for the correct positioning of a camera in relation to a front projection apparatus without the need for optical adjustment.

It is another object of the invention to provide means for reception of a camera on a front projection apparatus so as to permit adjustment of the camera focus without need for movement of the camera as a whole.

It is yet another object of the invention to provide means for securing the lens system of a camera in a predetermined axial and/or lateral positional relationship to the projection axis of a front projection apparatus.

SUMMARY OF THE INVENTION

The invention provides a front projection apparatus comprising an image projection system, means for adjustably supporting a camera, and means defining a position for the camera on said support such that the camera lens system views an image projected along the projection axis of the apparatus.

The apparatus can comprise a housing containing a projector arranged to project an image generally vertically upwardly so as to be reflected by a semi-reflective mirror generally horizontally along the projection axis of the apparatus. On top of the housing projector device, there is provided a selectively adjustable camera mount and sighting means for the lens system thereof, the sighting means being in fixed relationship to the mirror and projector. The sighting means can comprise an upright wall with an aperture with which the camera lens system can be registered. To facilitate such registration, the apparatus can include an adaptor arranged to be secured in fixed relationship to the camera lens system and engageable with the sighting means. The adaptor can comprise a short tube provided with a screw threaded for bayonet type connection at one end for reception by the camera lens system housing, and arranged at its other end to be received in the sighting means aperture.

The invention thus provides a front projection apparatus within which any one of a range of cameras can be quickly and conveniently located in a position in which the camera is correctly positioned to view a projected image along the projection axis, without any need for optical testing.

The invention also provides a front projection apparatus comprising an image projection system, means for clamping the lens system of a camera in a predetermined position relative to the projection axis mirror, and means permitting movement of the camera body relative to the lens system during changes in focussing of the camera, whereby such focussing can be achieved without disturbing the setting of the apparatus.

In normal circumstances, the predetermined camera lens position will be such that the projected image is viewed along the projection axis from a position thereon such that the nodal points of the camera and projector coincide. This position of the camera lens system in the apparatus will vary from camera to camera and it is in any event not normally convenient to clamp directly onto the lens system housing. An adaptor can therefore be provided which can take up fixed positions with regard to both the camera lens housing and the apparatus.

It will be apparent that the two aspects of the invention described can be readily combined, as by providing for the adjustable camera mount to permit sliding of the camera body in the direction of the projection axis, whilst the adaptor is arranged to be clamped in registration with the sighting means.

DETAILED DESCRIPTION

Figure 1:
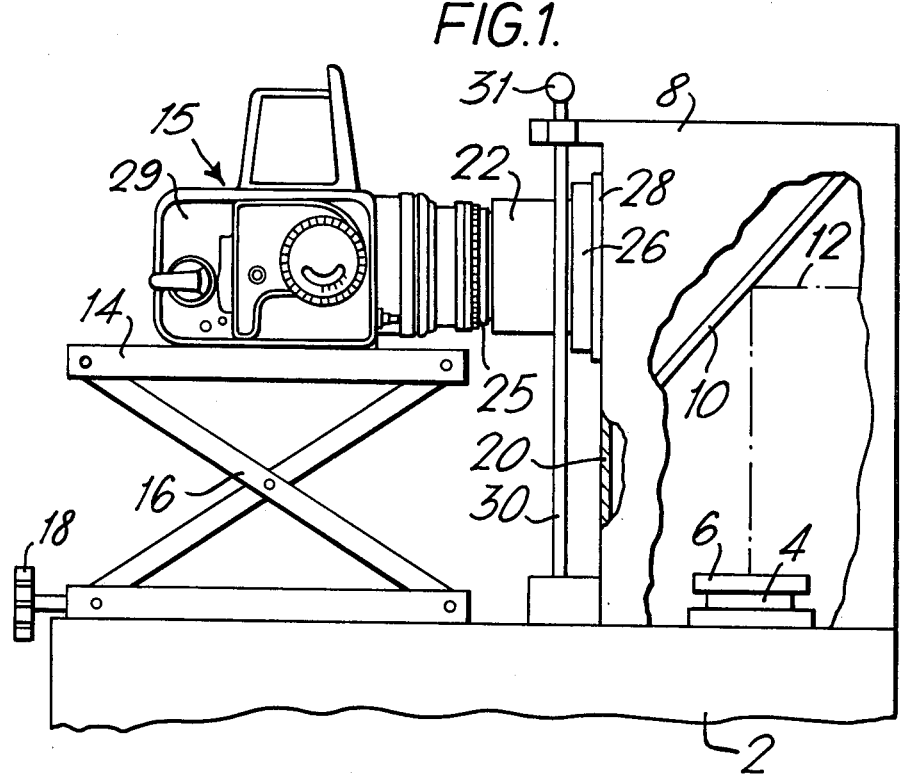
FIG. 1 is a partial side view of an illustrative front projection apparatus embodying the invention, with parts broken away.
Figure 2:
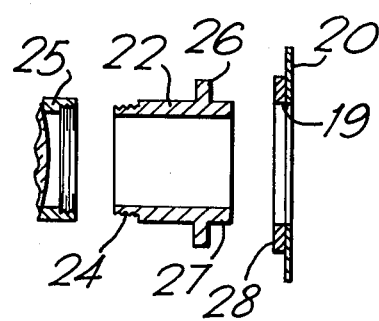
FIG. 2 is a fragmentary sectional view of the apparatus.
Figure 3:
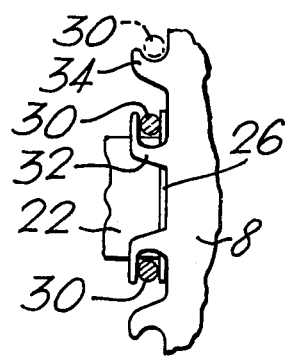
FIG. 3 is a fragmentary part sectional plan view of the apparatus.

The front projection apparatus illustrated comprises a generally rectangular housing 2, containing a projector for projecting a desired background image, for example from a slide 4, upwardly through a projector lens 6 mounted on the upper wall of the housing. Beneath the lens 6 there is provided a focussing platform for receiving a slide 4 to be projected. Above the lens 6, a sub-housing 8 supports a semi-reflective mirror 10 on its side walls of which one is shown broken away in FIG. 1 to indicate the position of the mirror; this has its half-silvered side underneath so that the projected image is reflected horizontally out of the open end of the sub-housing 8 to a suitable screen, along a projection axis 12. The projector within the housing 8 includes appropriate controls and may include provision for flash as an alternative to continuous illumination, together with appropriate means for synchronising operation of a camera received in the apparatus.

Rearwardly of the subhousing 8, the top wall of the housing 2 has secured thereto a camera mount permitting vertical adjustment. The mount comprises a platform 14, on which the camera can rest, and a scissors jack 16 by means of which the level of the platform 14 above the top wall of the housing 2 can be selectively adjusted, the platform being held horizontal, by operation of a control wheel 18.

The apparatus thus far described is generally conventional and permits front projection photographs to be taken by a camera 15 provided this is set upon the platform 14 in the correct position, as discussed above. To enable this position to be quickly and reliably reached and securely held, the invention provides sighting means comprising an aperture 19 in a rear wall 20 of the subhousing 8 with which the camera lens system can be registered.

To facilitate registration, the apparatus includes a tubular adaptor 22, cooperable with the aperture 19. The adaptor 22 has an externally screw-threaded portion of reduced diameter 24 at one end, arranged to be received in the internally-threaded end portion of the camera lens system housing 25. When fully screwed in, the adaptor 22 is in a fixed relation to the lens system. At the other end, the adaptor 22 has a tubular portion 27 separated from the main body of the adaptor by a flange 26.

The adaptor 22 when connected to the camera thus forms an extension of the lens system housing 25, and it and the aperture 19 are such that correct placement of the camera lens system with respect to the projection axis 12 is ensured when the end portion 27 of the adaptor is received in the aperture. The aperture 19 is shaped to receive the end portion 27 in a relatively close sliding fit, and a ring 28 is secured to the wall 20 around the aperture to provide an abutment for the flange 26 and a sliding fit over a substantial axial distance.

The arrangements so far described ensure correct axial positioning of the camera lens system, and to ensure that the lens system remains correctly located in spite of focussing changes of the camera, means are provided whereby the adaptor 22 is clamped to the apparatus, and the main body 29 of the camera can move within it.

The clamping means employed in the illustrated embodiment comprise a pair of clamping rods 30, having their lower ends mounted at the top wall of the housing 2 adjacent the wall 20. The rods are lightly spring biassed towards each other, and are sufficiently flexible to be movable rearwardly for a small distance. The rods project upwardly above the top of the sub-housing 8 and have knobs 31 at their free ends by which they can be readily manipulated. The rods 30 are received in use in respective recesses formed by projections 32 extending rearwardly from the top wall of the sub-housing 8. The spring bias causes the rods to engage the main body of the adaptor 22 and the projections 32 are such that the flange 26 is trapped between the rods and the ring 28. The adaptor 22 is thus held axially immovable.

When it is desired to release the adaptor 22, the rods 30 are moved apart until they have cleared the flange 26, so that the adaptor can be withdrawn. To enable the adaptor 22 to be aligned with the aperture 19 during setting up, without the need to hold the rods clear manually, they can be retained in outer recess positions by outer projections 34.

The camera lens housing 25 having been thus secured in the apparatus, adjustment of the camera focus requires movement of the main camera body 29. This movement can be accommodated in any suitable way, and in the illustrated embodiment the upper surface of the platform 14 is smooth enough to permit the camera body to slide thereon.

The apparatus of the invention can be employed with a variety of cameras of various types, an appropriate adaptor member being supplied for each. The adaptors will vary in their axial length, and in the nature of the fitting at the outer end which is required for connection with the particular lens housing of the camera concerned. The apparatus can be associated if desired with a floor supported trolley by means permitting vertical adjustment of the apparatus without alteration of the horizontal orientation of its projection axis.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. Front projection apparatus for use with a camera, said camera having:
   a body means,
   a tubular housing means extending from said body means,
   a lens system secured within said housing means, and
   means for selective movement of said housing means relative to said body means for focussing said camera, and said front projection apparatus having:
   an image projection means adapted to project an image along a projection axis, support means for supporting said camera body means, said support means permitting vertical and horizontal movement of said body means relative to said projection axis, and sighting means fixed in relation to said projection axis and releasably engageable with said lens system housing means in the position of said housing means in which said lens system axis views an image projected along said projection axis by said image projection means.

2. The apparatus of claim 1 wherein said sighting means comprises means defining an aperture for registration with said lens system housing.

3. The apparatus of claim 2 wherein said sighting means further includes tubular means spacing said lens system housing from said aperture defining means.

4. The apparatus of claim 1 wherein said lens system housing has a screw-fitting at the free end thereof, wherein said sighting means comprises wall means defining an aperture, and tubular means having at one end thereof a screw fitting complementary with said lens system housing screw fitting, and wherein means on said wall means and at other end of said tubular means are co-operable to align said lens system and said aperture with a predetermined spacing between said lens system and said wall means.

5. The apparatus of claim 4 further comprising clamp means releasably clamping together said tubular member and said wall means.

6. The apparatus of claim 1 wherein said support means provides a smooth substantially horizontal surface supporting said camera body means for sliding thereon.

7. The apparatus of claim 1 wherein said releaseable engagement between said lens system housing means and said sighting means is adapted to hold said housing means stationary relative to said image projection means during said relative movement of said camera body means and housing means.

8. The apparatus of claim 1 further comprising first connection means at the free end of said housing means, and second connection means on said sighting means, said second connection means being adapted to releasably mate with said first connection means.

9. The apparatus of claim 1 wherein said sighting means is releasably engageable with said lens system housing in the position of said housing means in which the nodal print of said lens system coincides with the nodal point of said image projection means.

10. Front projection apparatus for use with a camera having body means and lens means selectively movable relative to the body for focussing, the apparatus comprising projection means for projecting an image along a projection axis, support means for said camera body means, and holding means for releasably holding said camera lens means in an operative position relative to said projection means, wherein said holding means comprises wall means defining an aperture and tubular means releasably engageable with said lens means and with said wall means to align said lens means and said aperture, and clamping means for releasably clamping said tubular means to said wall means, wherein said tubular means has an end portion receivable in said aperture, flange means adjacent said end portion limiting entry of said end portion into said aperture by abutment with said wall means, wherein said clamping means comprises an elongate member on each side of said aperture, means movably connecting one end of each elongate member to said apparatus, and retaining means releasably receiving said elongate members therein with the flange means clamped between the elongate members and the wall means, and wherein said support means enables said camera body to be vertically and horizontally adjusted relative to said wall means without releasing said clamping means.

* * * * *